Jan. 31, 1961  R. E. JACKSON  2,970,221
PHOTOELECTRIC METERING APPARATUS
Filed Sept. 30, 1958  2 Sheets-Sheet 1
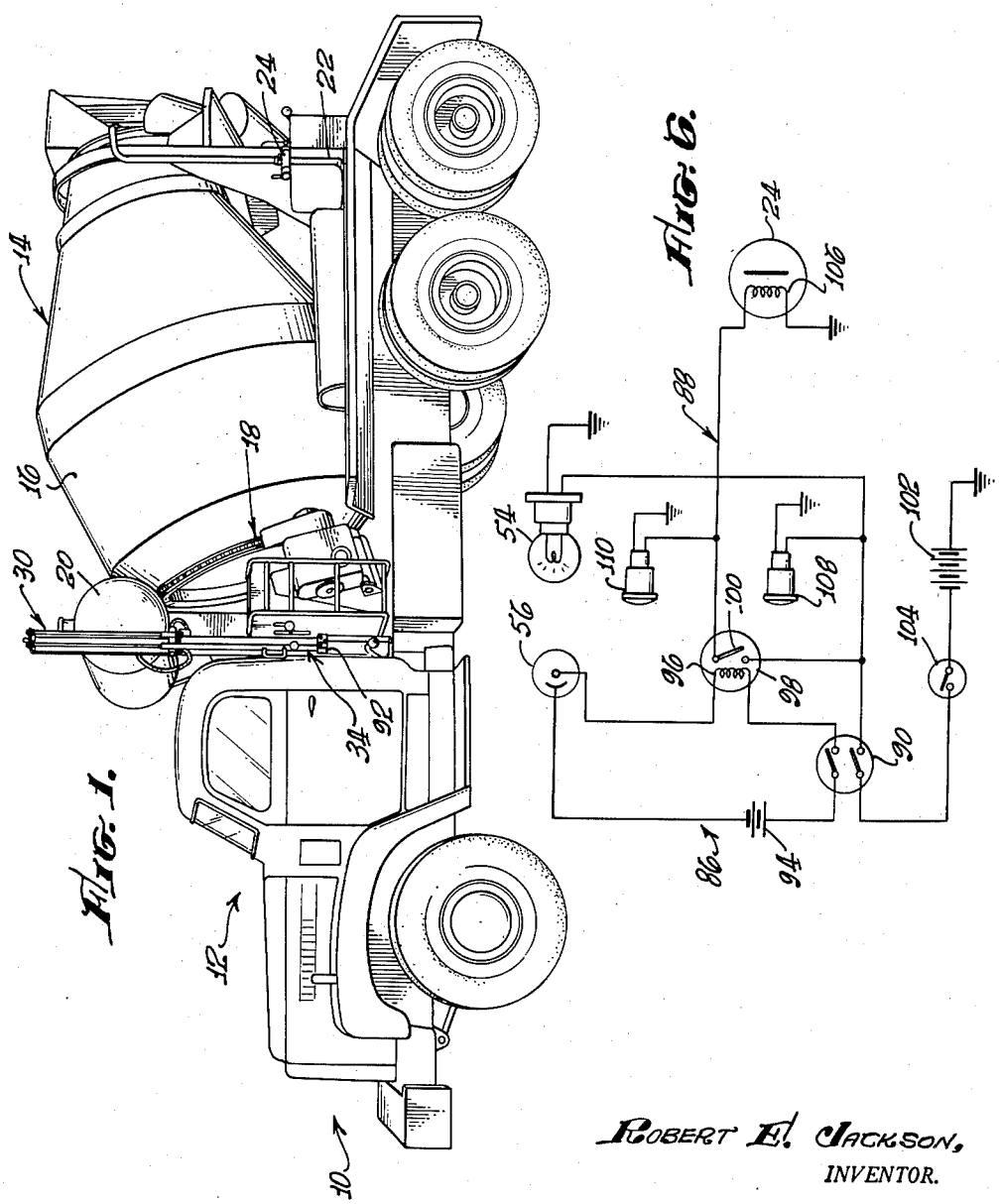
Robert E. Jackson,
INVENTOR.
BY HIS ATTORNEYS.
Harris, Kiech, Foster & Harris.

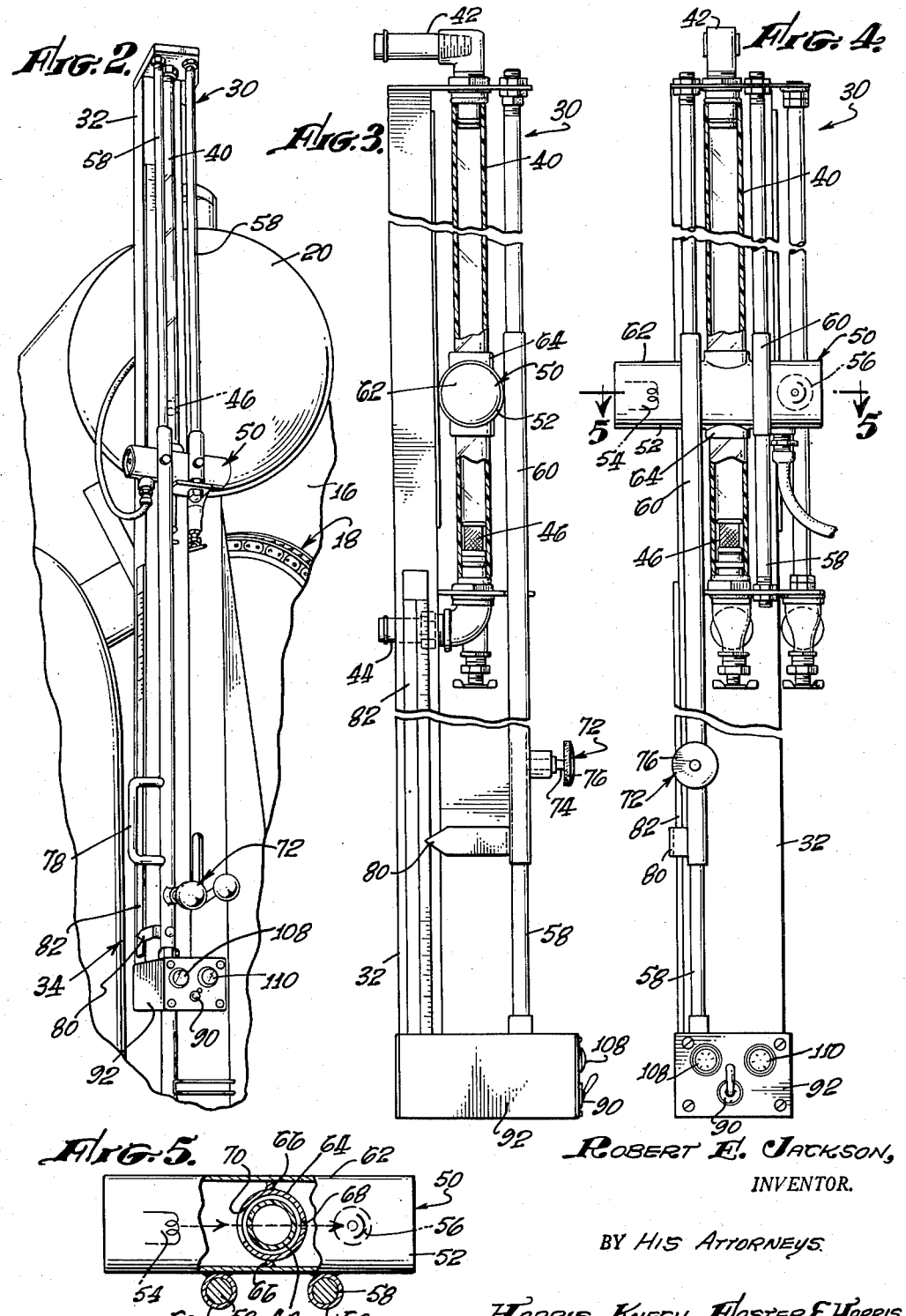

United States Patent Office 2,970,221
Patented Jan. 31, 1961

2,970,221

PHOTOELECTRIC METERING APPARATUS

Robert E. Jackson, West Covina, Calif., assignor, by mesne assignments, to Challenge-Cook Bros., Incorporated, Le Mirada, Calif., a corporation of California Filed Sept. 30, 1958, Ser. No. 764,381

1 Claim. (Cl. 250—218)

The present invention relates in general to a photoelectric metering apparatus and, more particularly, to a photoelectric apparatus for accurately metering a fluid to be dispensed.

The invention is of particular utility in connection with a truck mixer for concrete and therefore will be considered in such connection herein as a matter of convenience. A conventional truck mixer for concrete is a self-contained, self-propelled unit comprising a truck on which a concrete mixer is mounted, the constituents of the desired concrete mix being introduced into the mixer at one location and the mixer being operated while the truck is in transit to another location where the mix is to be used.

In order to avoid too wet a mix, the conventional practice is to introduce into the mixer at the starting location a little less water than is required for a proper mix, the necessary make-up water being added to the mix, and mixed therewith, just before delivery of the mix at the building site, or other location, where the mix is to be used. This enables the operator of the truck mixer to deliver a concrete mix which contains the proper proportion of water with no risk of having too wet a mix upon arrival at the location of use.

For the foregoing purpose, it is conventional to provide on the truck a water reservoir or tank containing a supply of make-up water from which the water necessary to obtain the desired mix consistency may be obtained. The make-up water is delivered to the concrete mixer from the reservoir through a control valve, preferably by means of a suitable pump.

An important object of the invention is to provide a truck mixer of the foregoing nature having thereon a photoelectric metering apparatus which operates the control valve mentioned and which may be set to deliver any desired quantity of make-up water from the reservoir to the concrete mixer in an accurate manner.

In general, the invention contemplates the use of an upright light-transmitting tube, hereinafter referred to as a "sight" tube, which is connected at its upper and lower ends to the reservoir so that the water levels in the reservoir and in the sight tube are the same. A float is provided within the sight tube to indicate the water level therein since clear water is transparent.

The invention further contemplates the use in conjunction with such a sight tube of a light source, a photoelectric cell, or equivalent light-responsive switch, and means providing a light path through the sight tube from the light source to the photoelectric cell. With this construction, the photoelectric cell receives light from the light source as long as the light path is not obstructed by the float within the sight tube, the photoelectric cell being utilized to operate the control valve leading from the reservoir to the concrete mixer to terminate the flow of make-up water from the reservoir into the concrete mixer after a predetermined quantity has been dispensed.

An important object of the invention is to mount the light source and the photoelectric cell on a common support which is movable longitudinally of the sight tube, preferably along guide means adjacent and parallel to the sight tube, to permit varying the quantity of make-up water to be dispensed.

More particularly, an object of the invention is to provide a support for the light source and the photoelectric cell which includes an elongated housing extending transversely of the sight tube and including a sleeve which encompasses and is movable longitudinally of the sight tube, the light source being disposed in one end of such housing and the photoelectric cell in the other and the light path from the light source to the photocell being provided by openings in the sleeve mentioned. With this construction, the light source and the photoelectric cell constitute a self-contained unit which may be shifted longitudinally of the sight tube readily, by moving the housing containing the light source and the photoelectric cell longitudinally of the guide means, to vary the amount of make-up water to be dispensed.

Another object is to provide a housing wherein one of the openings in the sleeve is a narrow slit in a plane perpendicular to the axis of the sight tube, such slit forming the light passing from the light source to the photoelectric cell into a beam which is thin longitudinally of the sight tube so that the light beam is cut off sharply by the float within the sight tube, either in response to upward or downward movement of the light source-photoelectric cell unit, or in response to downward movement of the float as make-up water is dispensed.

A further object of the invention is to provide an electric indicator, preferably a light, which is controlled by the photoelectric cell and which is deenergized whenever the light path between the photoelectric cell and the light source is obstructed by the float. With this construction, the water level in the sight tube, and thus in the reservoir, may readily be located to obtain a reference point by moving the light source-photoelectric cell unit longitudinally of the sight tube until the indicator light goes out. Once this reference point has been established, the photoelectric cell-light source unit is moved downwardly a distance corresponding to the quantity of make-up water to be dispensed, which distance may be determined by reference to a suitable scale calibrated in gallons, for example.

Another object is to provide a control valve between the reservoir and the concrete mixer which is electrically operated and which is controlled by the photoelectric cell in such a manner that when the float decends in the sight tube to the level at which the light source-photoelectric cell unit has been set, the photoelectric cell closes the control valve to terminate the delivery of make-up water to the concrete mixer.

A further object of the invention is to provide an operating circuit which includes the control valve and to provide an independent photocell circuit which includes the photoelectric cell and which includes means responsive to light transmission to the photoelectric cell for closing the operating circuit, such independence of the operating circuit and the photocell circuit being an important feature of the invention.

The foregoing objects, advantages, features and results of the present invention, together with various other objects, advantages, features and results thereof which will be evident to those skilled in the art to which the invention pertains in the light of the present disclosure, may be attained with the exemplary embodiment of the invention described in detail hereinafter and illustrated in the accompanying drawings, in which:

Fig. 1 is a perspective view of a truck mixer having the photoelectric metering apparatus of the invention mounted thereon;

Fig. 2 is an enlarged, fragmentary perspective view showing the photoelectric metering apparatus of the invention mounted on the truck mixer;

Fig. 3 is a front elevational view, which is partially in section, showing the photoelectric metering apparatus of the invention;

Fig. 4 is a side elevational view, which is partially in section, of the photoelectric metering apparatus;

Fig. 5 is a view, partially in section and partially in elevation, taken along the arrowed line 5—5 of Fig. 4; and Fig. 6 is a diagrammatic view showing the electrical circuitry of the invention.

Referring first to Figs. 1 and 2 of the drawings, the numeral 10 designates a conventional truck mixer comprising a truck 12 having a concrete mixer 14 mounted thereon, the mixer 14 including a rotary drum 16 and a driving mechanism 18 therefor. A reservoir or tank 20 for make-up water is mounted on the truck 12 and is connected to the drum 16 by a line 22 leading to the interior of the drum. Flow through the line 22 is regulated by a control valve 24 which will be discussed in more detail hereinafter. Preferably, the truck mixer 10 includes a pump, not shown, for pumping make-up water from the tank 20 into the drum 16 through the line 22. This pump may be a continuously operating one provided with a bypass through which the water in the pump is recirculated when the control valve 24 is closed.

The numeral 30 designates a photoelectric metering apparatus of the invention which includes a frame 32 suitably mounted on the truck 12 adjacent the tank 20, this apparatus including controls, designated generally by the numeral 34 and described in detail hereinafter, which are located adjacent the lower end of the apparatus so as to be accessible from the ground, or from the driver's seat of the truck 12.

Considering the apparatus 30 in more detail with particular reference to Figs. 3 and 4 of the drawings, it includes an upright, light transmitting, sight tube 40 carried by the frame 32 and provided at its upper and lower ends with upper and lower fittings 42 and 44 which are connected to the top and bottom, respectively, of the tank 20 in any suitable manner, not shown. The sight tube 40, of course, is located at the same horizontal level as the tank 20. Thus, the water level in the sight tube 40 always corresponds to the water level in the tank 20, the water level in the sight tube being indicated by a float 46 therein.

Movable longitudinally of the sight tube 40 is a photoelectric cell-light source unit 50 comprising a support 52 carrying a light source 54 and a photoelectric cell 56 on opposite sides of the sight tube. The support 52 is guided by a guide means which comprises guide rods 58 adjacent and parallel to the sight tube 40 and mounted on the frame 32. The support 52 has connected thereto tubes or sleeves 60 which are slidable on the guide rods 58.

Considering the support 52 in more detail, it includes, as shown in Figs. 3 to 5, an elongated housing 62 which is oriented transversely of the sight tube 40 and which includes a sleeve 64 encompassing the sight tube and spaced outwardly therefrom. The light source 54 and the photoelectric cell 56 are disposed in opposite ends of the housing 62 and are thus disposed on opposite sides of the sleeve 64 and the sight tube 40. A partition 66 between the sleeve 64 and the housing 62 prevents light transmission to the photoelectric cell 56 around the sleeve 64.

The unit 50 includes means providing a light path through the sight tube 40 from the light source 54 to the photoelectric cell 56, such means including an aperture 68 in one side of the sleeve 64 in register with the photoelectric cell 56 and a narrow slit 70 in the opposite side of the sleeve in register with the light source 54, the slit being in a plane perpendicular to the axis of the sight tube. The narrow slit 70 produces a thin light beam through the sight tube 40 so that the light beam is cut off sharply by the float 46, whereby the photoelectric cell 56 is energized or deenergized in response to slight relative movement of the float 46 and the unit 50 for greater accuracy.

One of the sleeves 60 extends downwardly a substantial distance below the unit 50 and carries a locking device 72 for locking the unit 50 in any desired position relative to the sight tube 40. The locking device 72 is shown as comprising a set screw 74 engageable with the corresponding guide rod 58 and provided with a knurled head or knob 76. The unit 50 may be moved longitudinally of the sight tube 40 by means of a handle 78, Fig. 2, on the sleeve 60 which carries the locking device 72. This same sleeve 60 also carries a pointer 80 which is movable over a scale 82 on the frame 32, the scale being calibrated to indicate the quantity of water in the tank 20, preferably in gallons. For convenience in using the present invention, the numerical values on the scale 82 preferably increase downwardly so that progressively higher scale readings are obtained as the unit 50 is moved downwardly relative to the sight tube 40. This inverted orientation of the scale 82 facilitates setting of the unit 50 to meter a predetermined quantity of water, as will be explained hereinafter.

It will be noted that the locking device 72, the handle 78 and the pointer 80 are all located well below the sight tube 40 for easy accessibility from the ground, or from the driver's seat of the truck 12, these elements forming part of the controls 34 hereinbefore mentioned.

Turning now to Fig. 6 of the drawings, the electrical circuitry of the photoelectric metering apparatus 30 of the invention includes independent photocell and operating circuits 86 and 88 adapted to be readied for energization simultaneously by means of a double pole switch 90 common thereto, the switch 90 being carried by a control box 92 at the lower end of the apparatus 30, as shown in Figs. 3 and 4, for accessibility.

The independent photocell circuit 86 includes the photoelectric cell 56, one-half of the double pole switch 90, a battery 94 and a coil 96 of a relay 98 which includes a switch 100 for closing the operating circuit 88 when light from the light source 54 reaches the photoelectric cell 56. The various elements of the photocell circuit 86 are connected in series as shown.

Considering the operating circuit 88, it includes the other half of the double pole switch 90, which is connected in series with the battery 102 of the truck 12 through the ignition switch 104 of the truck. The relay switch 100 is connected in series with the double pole switch 90 and connected to the relay switch is a coil 106 for operating the control valve 24 in the water line 22 leading from the tank 20 to the drum 16. Thus, when the switches 90 and 104 are closed, and when the light beam from the light source 54 to the photoelectric cell 56 is not obstructed by the float 46, the relay 98 is energized to close the relay switch 100 to energize the coil 106 of the control valve 24. Preferably, the control valve 24 is of the type which is held open by the coil 106, but which cannot be moved to open position by this coil, it being necessary to move the control valve to open position manually. This enables the operator of the truck mixer 10 to delay opening of the control valve until such time as he is ready to introduce make-up water into the drum 16, even though the unit 50 is set in a position such that the float 46 does not obstruct the light beam. The coil 106 holds the control valve 24 open, after manual movement of the control valve to open position, until such time as the water level in the tank 20 drops sufficiently to lower the float 46 into the light beam from the light source 54 to the photoelectric cell 56. Alternatively, the coil 106 of the control valve 24 may be capable of moving the control valve to open position and manual control over movement of the control valve to open position may be obtained by placing another manual switch, not shown, in series with the coil 106. For example, such other manual switch may be inserted between the relay switch 100 and the coil 106.

The light source 54 is preferably an electric lamp and it is connected in series with the battery 102 and the switches 104 and 90 so that it is energized when the switches are closed manually. The circuitry of the apparatus 30 also includes an "on" light 108 connected in series with the battery 102 and the switches 104 and 90, this light being energized when such switches are closed to indicate that the apparatus is ready for operation. The "on" light 108 is mounted on the control box 92 for easy viewing.

The electrical circuitry of the apparatus 30 also includes an indicator light 110 which is in parallel with the coil 106 of the control valve 24 so that it is energized whenever the manual switches 104 and 90 and the relay switch 100 are closed. Thus, the light 110, when energized, provides a visual indication that light from the source 54 is reaching the photoelectric cell 56 and is not being obstructed by the float 46. The light 110 is also mounted on the control box 92 for easy viewing.

Considering the operation of the invention, it will be assumed that the operator of the truck mixer 10 has arrived at the location where the concrete mix in the mixer 14 is to be delivered and has determined that fifty gallons of make-up water are necessary to bring the mix to the proper consistency for the particular job to be poured.

The first step is to close the double pole switch 90 to energize the photocell circuit 86 and to prepare the operating circuit 88 for energization. Normally, the ignition switch 104 will be closed under the conditions in question to keep the concrete mixer 14 in operation at all times, the driving mechanism 18 for the drum 16 normally including a power take-off from the engine of the truck 12. Consequently, it is normally not necessary to close the ignition switch 104 as a separate step.

The foregoing accomplished, the operator, starting with the unit 50 at the lower end of its travel, moves this unit upwardly slowly until the light beam from the source 54 to the photoelectric cell 56 is cut off by the lower end of the float 46. Such cutting off of the light beam is indicated by extinguishment of the indicator light 110, which previously was energized due to the fact that light reaching the photoelectric cell 56 energized the coil 96 of the relay 98 to close the relay switch 100.

The foregoing procedure determines the exact water level in the sight tube 40 and in the tank 20, and it will be assumed that the pointer 80 registers with the thirty-gallon indicium on the scale 82 under such conditions. Since, as previously stated, it is desired to deliver fifty gallons of make-up water to the mixer 14, the operator now moves the unit 50 downwardly until the pointer 80 is in register with the eighty-gallon indicium on the scale 82.

The next step is to move the control valve 24 to open position manually (or to close the alternative manual switch hereinbefore mentioned) to initiate delivery of water to the mixer 14. As the make-up water is delivered to the mixer 14, the water level in the tank 20 and in the sight tube 40 drops, causing the float 46 to descend correspondingly. Upon delivery of fifty gallons of make-up water to the mixer 14, the float 46 cuts off the light beam to the photoelectric cell 56, such cutting off of the light beam occurring suddenly due to the narrow slit 70. As soon as the light beam is cut off in this fashion, the photocell circuit 86 is opened to deenergize the relay 98, thereby deenergizing the control valve 24 to terminate the delivery of water to the mixer 14. At this point, the exact amount of make-up water desired has been delivered to the mixer.

Although an exemplary embodiment of the invention has been disclosed herein for purposes of illustration, it will be understood that various changes, modifications and substitutions may be incorporated in such embodiment without departing from the spirit of the invention as defined by the claim which follows:

I claim:

In a photoelectric liquid metering apparatus, the combination of: a reservoir; means for discharging liquid from said reservoir, including a valve; a vertical sight tube at the same horizontal level as said reservoir and connected at its ends to said reservoir so that the liquid level in said sight tube is the same as the liquid level in said reservoir; an opaque float in said sight tube; a support movable vertically along said sight tube; a light source carried by said support adjacent said sight tube; a photoelectric cell carried by said support adjacent said sight tube; means on said support providing a light path from said light source to said photoelectric cell through said sight tube, including slit-forming means on said support providing a narrow slit in a horizontal plane; means for opening said valve with said slit below said float; and means connected to said photoelectric cell for closing said valve in response to downward movement of said float into a position to obstruct said slit.

References Cited in the file of this patent

UNITED STATES PATENTS

| | | |
|---|---|---|
| 2,070,617 | Offutt | Feb. 16, 1937 |
| 2,197,205 | Cooper | Apr. 16, 1940 |
| 2,376,459 | Stevens | May 22, 1945 |
| 2,447,847 | Dresser | Aug. 24, 1948 |
| 2,455,243 | Epprecht | Nov. 30, 1948 |

OTHER REFERENCES

Farqharson et al.: Review of Scientific Instrument; volume 28; No. 5, May 1957, pp. 324, 325.